(12) United States Patent
Shenassa et al.

(10) Patent No.: US 6,842,856 B2
(45) Date of Patent: Jan. 11, 2005

(54) SYSTEM AND METHOD FOR DYNAMIC MANAGEMENT OF A STARTUP SEQUENCE

(75) Inventors: Hossein Shenassa, Calgary (CA); Calvin White, Calgary (CA)

(73) Assignee: Wind River Systems, Inc., Alameda, CA (US)

( * ) Notice: Subject to any disclaimer, the term of this patent is extended or adjusted under 35 U.S.C. 154(b) by 654 days.

(21) Appl. No.: 09/854,279

(22) Filed: May 11, 2001

(65) Prior Publication Data

US 2002/0169949 A1 Nov. 14, 2002

(51) Int. Cl.[7] .............................. G06F 13/10; G06F 1/24
(52) U.S. Cl. ........................ 713/1; 713/100; 717/106; 717/108; 717/120; 717/121; 707/1; 707/3; 707/100; 707/102
(58) Field of Search .................... 713/1, 100; 717/108, 717/106, 120, 121; 707/1, 3, 100, 102

(56) References Cited

U.S. PATENT DOCUMENTS

| | | | |
|---|---|---|---|
| 6,009,520 A | * | 12/1999 | Gharda .......................... 713/1 |
| 6,339,771 B1 | * | 1/2002 | Zimowski et al. .............. 707/2 |
| 6,430,556 B1 | * | 8/2002 | Goldberg et al. ............... 707/4 |
| 6,467,050 B1 | * | 10/2002 | Keung .......................... 714/27 |
| 6,633,923 B1 | * | 10/2003 | Kukura et al. .............. 719/316 |
| 6,708,189 B1 | * | 3/2004 | Fitzsimons et al. ......... 707/205 |
| 2001/0047472 A1 | * | 11/2001 | Huntington et al. ........... 713/2 |

FOREIGN PATENT DOCUMENTS

| | | | | |
|---|---|---|---|---|
| WO | WO99/40520 | * | 8/1999 | ....... G06F/15/1777 |

* cited by examiner

Primary Examiner—Rehana Perveen
(74) Attorney, Agent, or Firm—Fay Kaplun & Marcin, LLP

(57) ABSTRACT

A system, comprising a plug-in data structure to store plug-in data, the plug-in data structure including an initial list and an end list and a plug-in manager to read the plug-in data structure and start plug-ins corresponding to an order in the plug-in data structure, wherein the plug-in manager starts plug-ins on the initial list prior to plug-ins on the end list.

22 Claims, 4 Drawing Sheets

SYSTEM AND METHOD FOR DYNAMIC MANAGEMENT OF A STARTUP SEQUENCE

BACKGROUND INFORMATION

Many devices such as personal computers ("PCs"), personal digital assistants ("PDAs"), embedded devices, etc., contain processors or controllers and associated hardware and software. When a device containing a processor or controller is powered a startup sequence or boot process is triggered. This boot process is generally a series of steps executed by the device to load the operating system. The steps that occur during this boot process may be hardware and software dependent, but generally result in the processor displaying to a user that the system is ready for user input.

A typical boot process includes a power on self test where the device tests its memory, verifies that it has the necessary hardware (e.g., a keyboard, video display, mouse, etc) and allows other peripherals (e.g., adapter cards, printers, etc) time to run their own self tests. The device may then load a Master Boot Record ("MBR") into memory, which in turn locates the active partition and loads the boot sector into memory (for a device with a hard disk). The next series of steps chooses the operating system ("OS") to run on the device. The steps may include switching the processor into a different memory mode (e.g., from real mode to a 32-bit flat memory mode), starting the appropriate file system to read files from a hard disk or flash memory, selecting the OS and gathering information about the device hardware. The next series of steps may be to select the hardware configuration and control set for the current boot and load the appropriate device drivers for the configuration. A session manager may then be started which runs programs listed in a boot registry and the starting of required subsystems. Finally, a logon prompt may appear, to which the user will respond with the appropriate command.

Similar to the boot process described above, when an application program or development software is started on a device, a series of steps may be carried out to start different pieces of software for the processor to carry out the commands directed by the application software. Such pieces of software may be referred to as plug-ins, tools, objects, etc.

SUMMARY OF THE INVENTION

A system, comprising a plug-in data structure to store plug-in data, the plug-in data structure including an initial list and an end list and a plug-in manager to read the plug-in data structure and start plug-ins corresponding to an order in the plug-in data structure, wherein the plug-in manager starts plug-ins on the initial list prior to plug-ins on the end list. Further, a method of starting plug-ins, comprising the steps of reading a first set of plug-ins listed in an initial list, reading a second set of plug-ins listed in an end list, assembling a startup sequence from the first and second sets of plug-ins, wherein the first set of plug-ins is included in the startup sequence before the second set of plug-ins and starting the plug-ins in the order corresponding to the startup sequence.

DETAILED DESCRIPTION

Figures 1, 2:
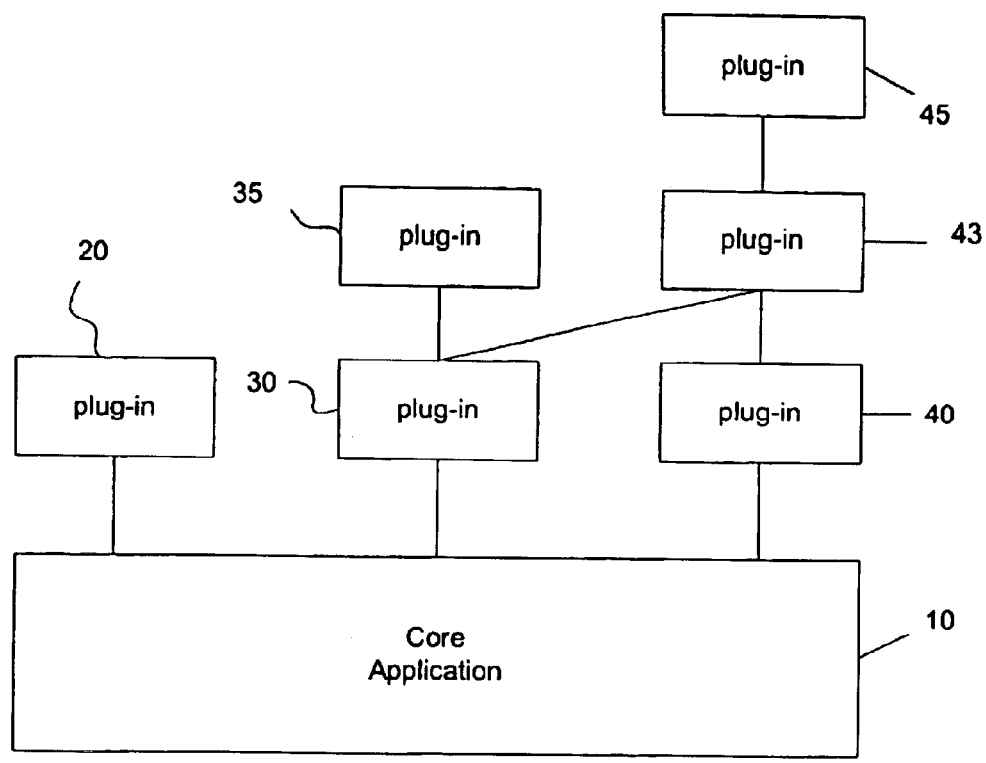
FIG. 1 shows an exemplary core application having a series of plug-ins.
FIG. 2 shows an exemplary table showing an exemplary hardcoded startup sequence for plug-ins according to the present invention.

The present invention may be further understood with reference to the following description of preferred exemplary embodiments and the related appended drawings, wherein like elements are provided with the same reference numerals. It should be understood that the present invention may be implemented on any processor or controller based device such as PCs, servers, PDAs, embedded devices, etc., and the term devices will be used throughout this description to generically refer to all such devices. Additionally, this description will refer to plug-ins which may be considered software modules that add specific features or services to a larger system. Those skilled in the art may refer to such software modules under a variety of names including objects, tools, applications, helper applications, services, etc. The present invention may be used to implement a startup sequence for all such software modules.

FIG. 1 shows an exemplary core application 10 having a series of plug-ins 20–45. Core application 10 may be any application or development software, for example, an application to develop, deploy, and manage Internet devices such as WindStorm® sold by Wind River Systems, Inc. of Alameda, Calif. Each of plug-ins 20–45 may be a standard or custom software module which adds a specific function to core application 10, for example, a timer. Plug-ins 20–45 may be considered as part of a framework into which each of plug-ins 20–45 contribute their functionality. As shown in FIG. 1, there may be inter-dependencies between plug-ins. For example, plug-in 30 may need to be started before plug-in 35 may be started. Similarly, plug-ins 30 and 40 may need to be started before plug-in 43 may be started. Another example of an inter-dependency that is not shown in FIG. 1 is where a plug-in may not be started until all other plug-ins have been started.

Core application 10, upon being started by a user, may start all of plug-ins 20–45. Such a startup sequence may be referred to as a hardcoded sequence. In a hardcoded sequence, plug-ins 20–45 are started in a predetermined order as listed in the hardcoded sequence. For example, FIG. 2 shows an exemplary table 50 showing an exemplary hardcoded startup sequence for plug-ins 20–45. As shown in table 50, plug-in 20 is started first, followed in order by plug-in 30, plug-in 40, plug-in 35, plug-in 43 and plug-in 45. The developer of core application 10 may display table 50 through the use of a built in function having a name of, for example, getStartupSequence( ). This function may return an array of plug-in descriptors corresponding to the startup sequence of the plug-ins. In this manner, the developer may rearrange the startup sequence.

The hardcoded sequence may be initially set by the developer of core application 10 or may be set by a user of core application 10. When setting the hardcoded sequence, the user and/or developer must be aware of all of the inter-dependencies between the plug-ins. For example, referring back to table 50, if plug-in 35 is placed in the sequence prior to plug-in 30, plug-in 35 may not start correctly because of its dependency on plug-in 30. When a new plug-in is added, the hardcoded sequence must be changed to accommodate the new plug-in, taking into account all of the new plug-in's inter-dependencies. Additionally, in order to have immediate access to all plug-ins, the hardcoded sequence must include all of the plug-ins. Referring to FIG. 1, for the user of core application 10 to have immediate access to all of plug-ins 20–45, the hardcoded sequence for core application 10 must include all of plug-ins 20–45. This requires that all of plug-ins 20–45 be loaded into the system memory of the device when core application 10 is started. This may not be the most efficient use of memory resources, especially where one or more plug-ins are used very infrequently. For example, a user of core application 10 may go multiple user sessions without using plug-in 45. The memory space occupied by plug-in 45 may be more efficiently used for other purposes.

Another method of starting plug-ins may be referred to as lazy initiation, where the plug-ins are started as required. For example, a user operating core application 10 may desire to use the functionality provided by plug-in 20. Using lazy initiation, plug-in 20 is only started when the user requests the functionality. The functionality may then be carried out by core application 10. Issues may arise with lazy initiation when, for example, a requested plug-in A depends on another plug-in B to be running on the framework where plug-in B has not yet been started nor is plug-in B requested. For example, referring to FIG. 1, the user may request the functionality of plug-in 35, without having previously requested the functionality provided by plug-in 30. Since plug-in 35 depends on plug-in 30, plug-in 35 may not be started correctly when requested by the user. Additionally, lazy initiation of plug-ins may result in sluggish operation of the system because the requested plug-in is not immediately available when initially called by the user. Rather, the user must wait until the plug-in is started and has gone through its life cycle by its plug-in manager. The life cycle of a plug-in will be described in greater detail below.

Figure 3:
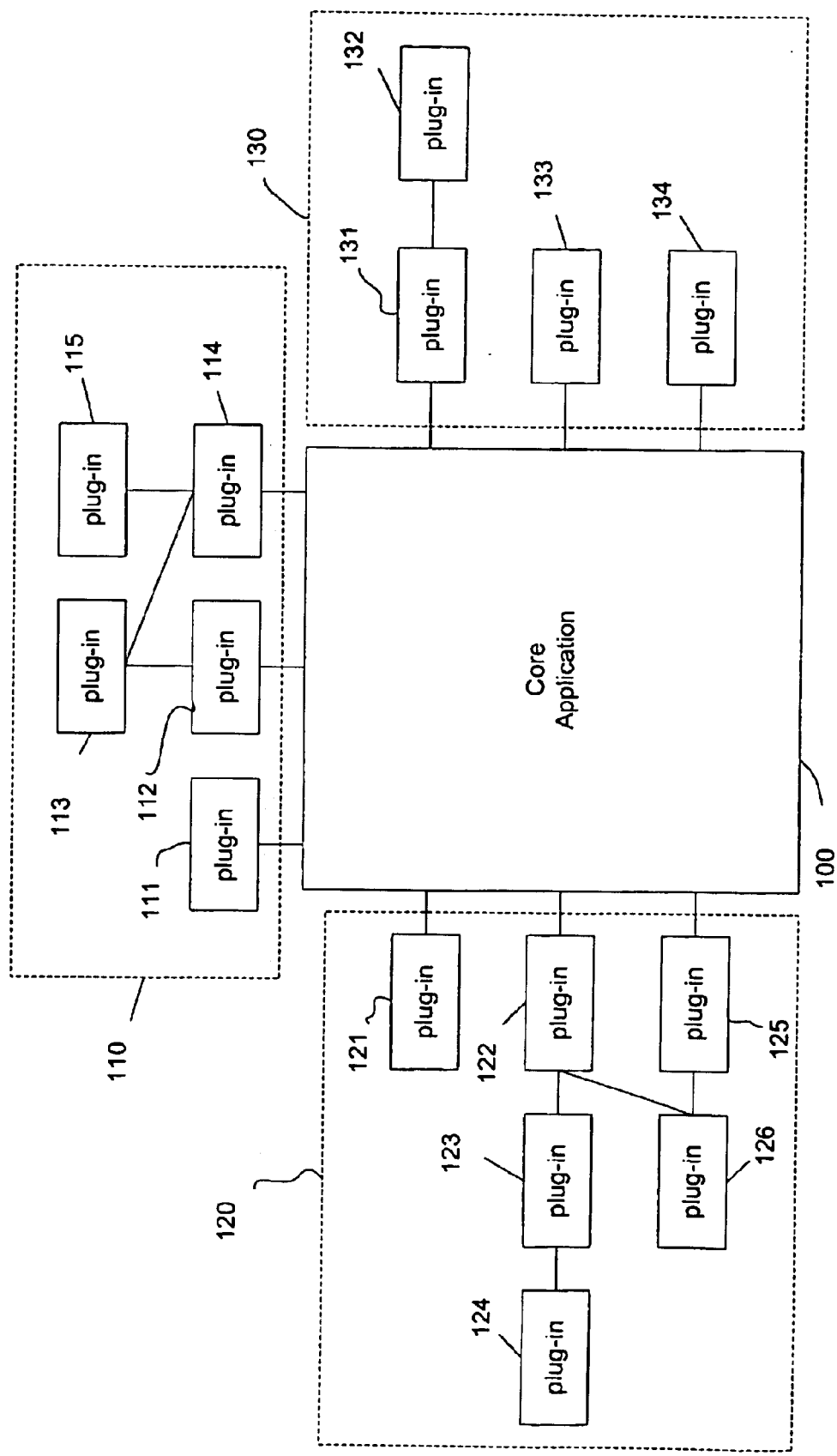
FIG. 3 shows a second exemplary core application having a series of plug-ins managed by plug-in managers according to the present invention.

FIG. 3 shows another exemplary core application 100 having a series of plug-ins 111–115, 121–126, and 131–134 managed by plug-in managers 110, 120, and 130, respectively. Those skilled in the art will understand that the representation of plug-in managers 110, 120 and 130 in FIG. 3 is only to show which plug-ins are controlled by the corresponding plug-in managers. The actual plug-in manager 110, 120 and 130 may be a function provided as part of core application 100, may be an independent software program that is loaded and run or maybe included as one or more plug-ins. For example, plug-in 111 may provide the functionality of plug-in manager 110. The plug-in managers may be implemented, for example, using object oriented programming. As in the example of FIG. 1, the lines between the plug-ins represent inter-dependencies. For example, plug-in 113 is dependent on both of plug-ins 112 and 114. Plug-in managers 110, 120, and 130 manage the respective plug-ins under their control. Management may include the creation of a plug-in context for the plug-in and management of the plug-in's life cycle. The plug-in context may contain methods allowing a plug-in to acquire references to the exposed public interfaces of other plug-ins available in the system and may provide a particular plug-in with access to its properties and identity information. In the context here, the dependencies between plug-ins means that a plug-in may require another plug-in to be running within the framework before it is started. For example, plug-in 132 may be dependent on plug-in 131, thus requiring plug-in 131 to be started before plug-in 132 is loaded and started.

To give a specific example, plug-in 132 may be a service plug-in and plug-in 131 may be a service manager plug-in. Service plug-in 132 may depend on service manager plug-in 131, even though service plug-in 132 may not depend on any of the exported public interfaces of service manager plug-in 131. If service manager plug-in 131 is not started on the framework, service plug-in 132 may not be started properly since service manager plug-in 131 is listening to loading of service plug-ins (e.g., service plug-in 132). If service manager plug-in 131 is started on the framework and it is notified of the request for service plug-in 132, it will apply the life cycle methods (to be described below) to service plug-in 132. When service plug-in 132 has gone through its initialization and start cycles it is ready to be used by other plug-ins. Without service manager plug-in 131, service plug-in 132 will not be initialized and started, thus the service it is to provide to the framework is not available.

Figure 4:
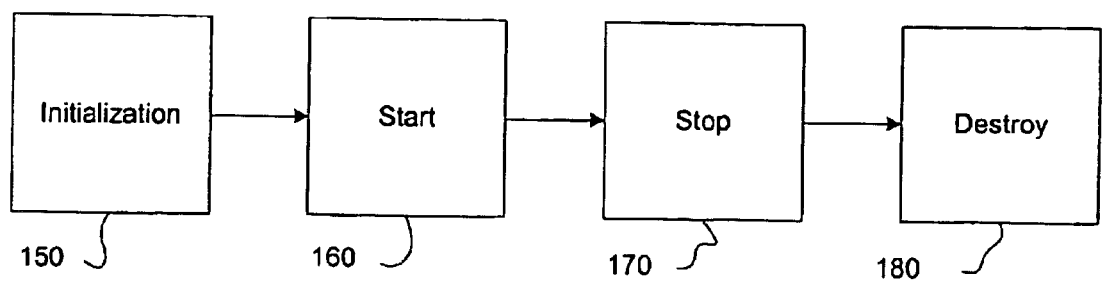
FIG. 4 shows a block diagram of an exemplary life cycle of a plug-in according to the present invention.

FIG. 4 shows a block diagram of an exemplary life cycle of a plug-in. As described above, the plug-in manager may provide management of a plug-ins life cycle. For example, plug-in manager 130 may manage the life cycle of plug-ins 131–134 which are under its control. Those of skill in the art will understand that the block diagram of FIG. 4 is only exemplary and the life cycle of a plug-in may include more or less stages than those shown. Additionally, the progression from initialization stage 150 to start stage 160 to stop stage 170 to destroy stage 180 may not be linear. For example, a particular plug-in may be stopped in stop stage 170 and then returned to start stage 160 to begin again. Similarly, a plug-in operating in start stage 160, may need to be reinitialized in step 150 because of some problem with the plug-in or the device. The first stage in the life cycle of a plug-in is initialization stage 150 which may include methods for registering with other plug-ins and creating internal objects. The methods of initialization stage 150 are generally called immediately after the plug-in is created. The methods included in initialization stage 150 may allow the plug-in to be reinitialized properly when there is a problem. When the device is managed remotely, the plug-in may be reset by calling the methods of initialization stage 150.

The next stage in the life cycle of the plug-in is start stage 160 which contains methods to activate the plug-in. These methods may be called at various times depending on the life cycle the plug-in manager applies to the plug-in. For example, referring to FIG. 3, if plug-ins 121–126 are services, the methods of start stage 160 are called for each of plug-ins 121–126 as soon as plug-in manager 120 is notified of the existence of each of plug-ins 121–126 (immediately after the initialization method is called on each of the plug-ins). As a further example, if plug-ins 111–115 are applications, the methods of start stage 160 for a particular one of these plug-ins is called each time a user of core application 100 selects the particular application. Service and application plug-ins will be described in greater detail below. Other methods of start stage 160 may display an application plug-in, start internal processes within the plug-in and start threads which are parts of a program or application that can execute independently of other parts.

The next stage in the life cycle of the plug-in is stop stage 170 which contains methods to deactivate the plug-in. Implementation of the methods of stop stage 170 allows the system to maintain an appropriate heap size and run more efficiently through more efficient use of the processor cycle. If the methods of stop stage 170 are not implemented properly, stale references and useless threads may cause the system to crash. Once again, the methods of stop stage 170 may be called at various times depending on the life cycle the plug-in manager applies to the plug-in. Returning to the above example in which plug-ins 121–126 are services, the methods of stop stage 170 may be called during a reset just before the service is to be deleted. These methods stop threads and other internal processes. In the case of application plug-ins 111–115, the methods of stop stage 170 may be called when a user deselects the application or when the device enters an idle state. These methods may cause the application plug-in to deregister from listeners (e.g., a keyboard listener), stop active threads and null out unnecessary object references to allow garbage collection.

The final stage in the life cycle of a plug-in is destroy stage 180 which contains methods that are called when the plug-in is about to be unloaded. The methods of destroy stage 180 essentially reverse the actions taken by the methods called during initialization stage 150. The methods allow the resources used by the plug-in to be returned to the system to minimize the drain on system resources (e.g., system memory, processor usage, etc.). The methods of destroy stage 180 may also deregister a plug-in from all the places where it has been registered, ensuring that the resources are returned to the system.

As described above, there may be different types of plug-ins. For example, plug-ins 111–115 may be applications, plug-ins 121–126 may be services and plug-ins 131–134 may be options. An application plug-in is an application that is visible to a user through a user interface such as a graphical user interface ("GUI"). The application plug-in is only active when selected by the user and visible to the user. A service plug-in provides a service without a user interface, which means that users cannot select a service plug-in. Service plug-ins are active once their corresponding plug-in managers are aware that the service plug-ins are loaded into the framework. Option plug-ins may be used, for example, to configure certain aspects of the device. In the example of FIG. 3, each of the types of plug-ins is managed by a separate plug-in manager (i.e., application plug-ins 111–115 are managed by application plug-in manager 110, service plug-ins 121–126 are managed by service plug-in manager 120 and option plug-ins 131–134 are managed by option plug-in manager 130).

Figure 5:
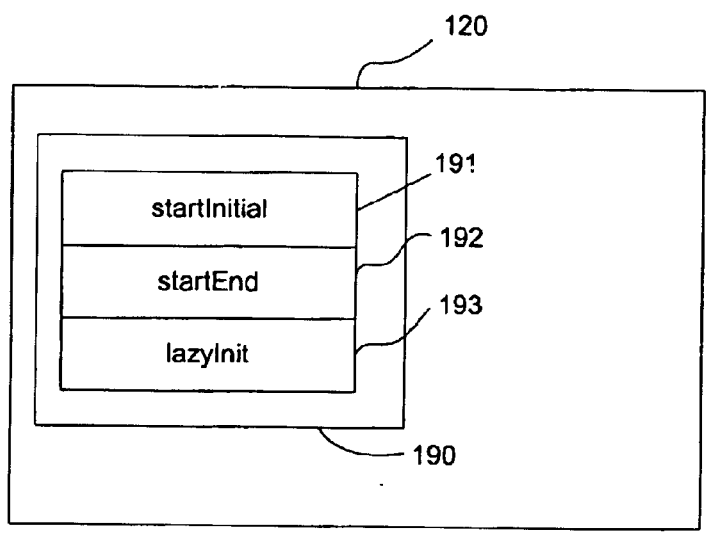
FIG. 5 shows an exemplary plug-in manager having a startup class containing properties for the starting of plug-ins according to the present invention.

As described above, an issue that arises with the various plug-ins is when to start (or load) the plug-in. This starting of the plug-ins is controlled by plug-in managers 110–130. Each of plug-in managers 110–130 has an instance of a startup class which controls the sequence of the starting of plug-ins it manages. FIG. 5 shows exemplary plug-in manager 120 having startup class 190 which contains properties 191–193 for the starting of plug-ins managed by it. Startup class 190 may be considered an abstract class for a startup plug-in. In addition to properties 191–193, startup class 190 contains the methods that the plug-in managers use to initialize and start plug-ins. For example, the method getStartupSequence( ) described above, may be a method that startup class 190 makes available to the plug-in managers. When a plug-in manager determines that there is a startup sequence, the plug-in manager may use the getStartupSequence( ) method to find the sequence in which it should start its plug-ins. As a further example, there may be another method that may be named formStartupSequence( ) that the plug-in managers may use to form the actual startup sequence.

The methods described above may find the startup sequence using properties 191–193 which provide a data structure in which the plug-in sequence may be stored. The data structure may have an initial setting or it may be a blank structure which, in either case, may be altered by a developer to customize the startup sequence. As described below, property startInitial 191 and startEnd 192 are lists which may be in any standard format, for example, comma separated text format, a linked list, an array, a vector, etc. The list data structures allow the developer to include plug-ins on the appropriate list to accomplish the desired startup sequence. Property startInitial 191 specifies the plug-ins that should be started first and the order in which these plug-ins should be started. Property startEnd 192 specifies the plug-ins that should be started last and the order in which these last plug-ins should be started. Property lazyInit 193 specifies whether the remaining plug-ins (i.e., the plug-ins not in the startInitial 191 or startEnd 192 lists) should be included in the startup list or not. The operation of the plug-in managers, the startup class, and the startup sequence of the plug-ins will be described using the following examples which refer to startup class 190 and properties 191–193 of FIG. 5 and plug-ins 121–126 under the control of plug-in manager 120 of FIG. 3.

EXAMPLE 1 startInitial 191=plug-in 121, plug-in 122, plug-in 125
startEnd 192=plug-in 124
lazyInit 193=false In this example, the returned startup sequence may be:

plug-in 121, plug-in 122, plug-in 125, plug-in 123, plug-in 126, plug-in 124

Initially, in Example 1, the plug-ins are listed using their names. However, the present invention may be implemented using any method of identifying plug-ins (e.g., describing plug-ins using their class names and versions). As described above, the plug-ins in the list of property startInitial 191 are the first plug-ins that are to be started and the order in which these first plug-ins should be started. Thus, plug-in manager 120 retrieves the list from startInitial 191 and finds that the plug-ins listed are in the order plug-in 121, plug-in 122, and plug-in 125. Using this information, plug-in manager 120 starts each of the plug-ins in the startInitial 191 list order. Plug-in manager 120 then retrieves the startEnd 192 list to determine if there are any plug-ins which are to be started last. In this example, startEnd 192 list contains plug-in 124. Thus, plug-in manager 120 is aware that plug-in 124 should be started last. Plug-in manager 120 then retrieves the lazyInit 193 flag to determine whether the remaining plug-ins should be included in the startup sequence. In this example, lazyInit 193 flag is set to false meaning that the remaining plug-ins should be included in the startup sequence. Thus, plug-in manager 120 starts plug-in 123 and plug-in 126 before starting plug-in 124 which should be the last plug-in started in the startup sequence based on the list of startEnd 192. The starting of plug-ins 123 and 126 may be in any arbitrary order between the plug-ins on the startInitial 191 and startEnd 192 lists.

EXAMPLE 2 startInitial 191=plug-in 121, plug-in 122, plug-in 125
lazyInit 193=true In this example, the returned startup sequence will be:

plug-in 121, plug-in 122, plug-in 125

As in Example 1, plug-in manager 120 retrieves the list from startInitial 191 and starts each of the plug-ins in the order they appear on startInitial 191 list (i.e., plug-in 121, plug-in 122, and plug-in 125). However, in this example there is no startEnd 192 list and therefore plug-in manager 120 does not need to place any plug-ins last in the startup sequence.

Plug-in manager 120 then retrieves the lazyInit 193 flag which is set to true in this example meaning that the remaining plug-ins should not be included in the startup sequence. Thus, the only plug-ins that are started based on the startup sequence are those included on startInitial 191 list (i.e., plug-in 121, plug-in 122, and plug-in 125). All other plug-ins will be started on demand, for example, when requested by a user or when another plug-in attempts to use the functionality associated with the plug-in. If a plug-in which is started on demand is dependent on another plug-in (the provider plug-in), the requested provider plug-in may be loaded (if not already loaded into the framework) and started. In this manner, any provider plug-ins which may need to be loaded and started prior to the requested plug-in may be loaded and started.

EXAMPLE 3 startEnd 192=plug-in 123, plug-in 124 lazyInit 193=false

In this example, the returned startup sequence will be:

plug-in 121, plug-in 122, plug-in 126, plug-in 125, plug-in 123, plug-in 124

In this example, there is no startInitial 191 list for plug-in manager 120 to retrieve. Plug-in manager 120 then retrieves startEnd 192 list and determines that plug-in 123 and then plug-in 124 should be added as the last plug-ins in the startup sequence. Plug-in manager 120 then retrieves the lazyInit 193 flag which is set to false in this example, meaning that the remaining plug-ins should be included in the startup sequence. Thus, plug-in manager 120 starts all of the plug-ins except plug-ins 123 and 124 (i.e., plug-in 121, plug-in 122, plug-in 126, plug-in 125) in an arbitrary order and then starts plug-in 123 and plug-in 124, respectively.

Those skilled in the art will understand that the startup sequences shown in Examples 1–3 are only for illustrative purposes and may not be the most efficient manner of starting plug-ins based on the inter-dependencies shown in FIG. 3. For example, referring to Example 2, plug-in 124 may be the first plug-in demanded by the user. Plug-in 124 is dependent on both plug-in 122 and plug-in 123, but only plug-in 122 was started during the startup sequence. Thus, plug-in 123 may need to be started prior to the starting of plug-in 124. Thus, it may have been more efficient to start plug-in 123 during the startup sequence by including it in either of the startInitial 191 or startEnd 192 lists. In contrast, plug-ins 123 and 124 may be used so infrequently by the user that it is more efficient not to include these in the startup sequence. In this case, the infrequent use does not warrant the using of resources to start plug-ins 123 and 124 and, thus the startup sequence of Example 2 may be the most efficient manner of starting the plug-ins.

This manner of assembling a startup sequence of plug-ins allows users and developers flexibility in dealing with the inter-dependencies of plug-ins, accounting for the frequency of use of particular plug-ins, the insertion of new plug-ins and the deletion of existing plug-ins. It allows for dynamic changes to the startup sequence for more efficient use of the system resources and to account for changes in the make-up and/or functionality of the plug-ins. For example, the developer may desire to introduce a new plug-in to the system. If the new plug-in is not dependent on any other plug-ins, it may be inserted without any change to the startup sequence. If lazyInit 193 flag is set to true, the new plug-in will be started on demand. Whereas, if lazyInit 193 flag is set to false, the new plug-in will be arbitrarily started in the startup sequence between the plug-ins on startInitial 191 list and startEnd 192 list, respectively. If the new plug-in is dependent on any other plug-ins, the developer may easily change the startup sequence to account for any dependencies. For example, by adding the plug-in on which the new plug-in depends to the startup sequence through inclusion on startInitial 191 list. The dynamic nature of the startup sequence may also allow for the system to track a users preferences and use of plug-ins during device operation. The startup sequence may then by dynamically altered, either automatically or manually, to account for a particular users preferences.

Figure 6:
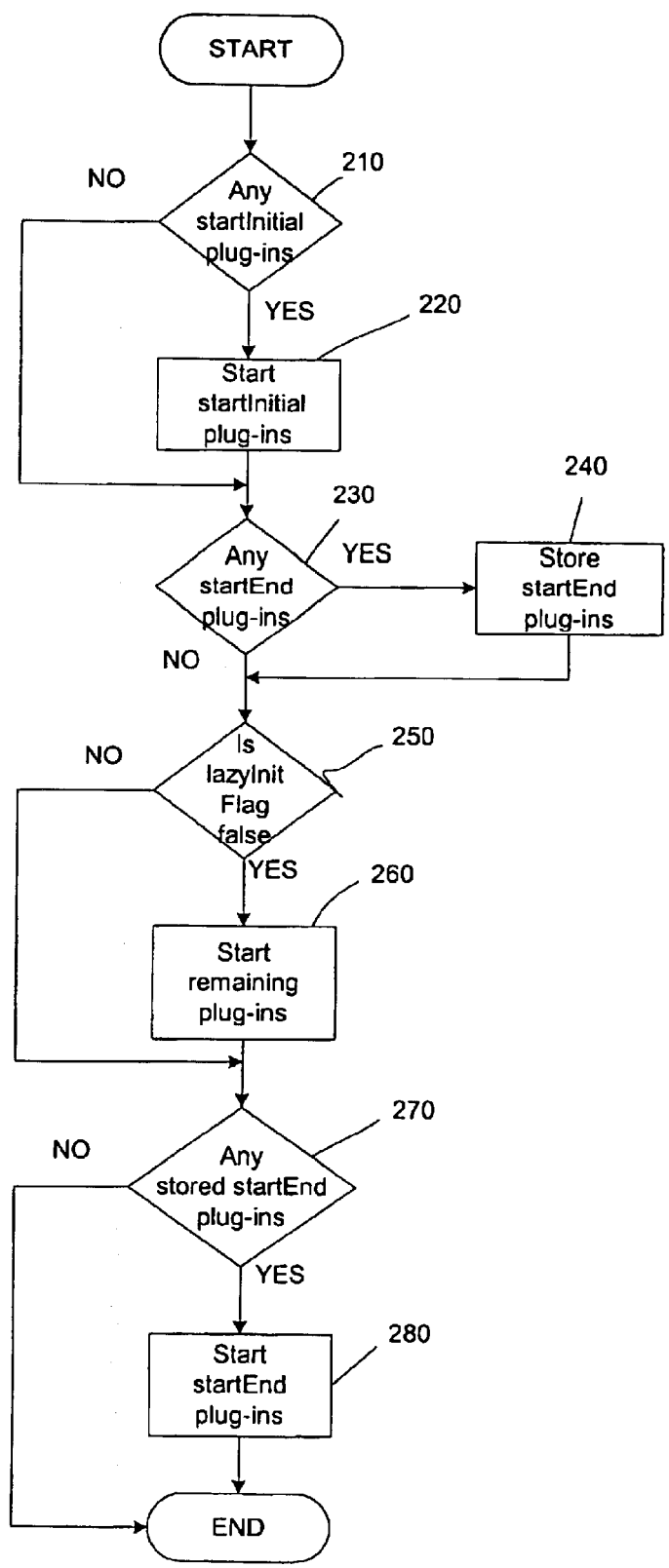
FIG. 6 shows an exemplary process for creating a startup sequence according to the present invention.

FIG. 6 shows an exemplary process 200 for creating a startup sequence. As described above, each of plug-in managers 110–130 may perform this process for the plug-ins for which it is assigned management responsibility. Those skilled in the art will understand that there may be other components on the device which also perform this process. In step 210 it is determined whether there are any plug-ins on startInitial 191 list. If there are plug-ins on startInitial 191 list, the process continues to step 220 where the plug-ins are started in the order in which they appear on startInitial 191 list. In multi-tasking systems, the plug-ins may be started in the current thread or in a newly created thread. When a plug-in is started in a newly created thread, it is sometimes referred to as being started in the background.

After the plug-ins on startInitial 191 list are started in step 220, or if it was determined in step 210 that there are no plug-ins on startInitial 191 list, the process continues to step 230 where it is determined whether there are any plug-ins on startEnd 192 list. If there are any plug-ins on startEnd 192 list, the process continues to step 240 where the order of the plug-ins on startEnd 192 list are stored by the plug-in manager. As described above, the plug-ins on startEnd 192 list are those plug-ins which are to be started last in the startup sequence. After the plug-ins on startEnd 192 list are stored in step 240 or, if it was determined in step 230 that there are no plug-ins on startEnd 192 list, the process continues to step 250 to determine the setting of the lazyInit 193 flag. If the lazyInit 193 flag is set to false, meaning that the remaining plug-ins (i.e., those plug-ins not on the startInitial 191 list and startEnd 192 list) should be started as part of the startup sequence, the process continues to step 260 to start those plug-ins. As described above, the corresponding plug-in manager may start these plug-ins in any order within the startup sequence between the plug-ins on startInitial 191 list and startEnd 192 list, respectively.

If the lazyInit 193 flag is set to true, the remaining plug-ins will not be started as part of the startup sequence. Rather, each of the remaining plug-ins will be started in response to user requests during device operation. In that case or after the completion of step 260, the process continues to step 270 to determine whether there are any stored plug-ins from startEnd 192 list. If there are stored plug-ins from startEnd 192 list (as described in step 240), these plug-ins may be started in step 280. If it is determined that there are no stored plug-ins from startEnd 192 list or after the completion of step 280, the process ends. After completion of the process, the startup sequence is complete meaning that all plug-ins that should be started as part of the startup sequence are started. Any remaining plug-ins that are not started will be started on demand.

In an alternative embodiment of exemplary process 200 illustrated by FIG. 6, the plug-in manager may start the plug-ins in the order of the startup sequence in a blocking call. In this case, the startup plug-in associated with the plug-in manager may create the entire startup sequence by, for example, storing a sequential list of plug-ins. When the entire startup sequence is complete, the plug-in manager may start all of the plug-ins in the startup sequence before the plug-in manager performs any other operations. For example, steps 220, 260 and 280 where plug-ins are started may be replaced by steps where the sequential list of plug-ins is created. Then a last step of starting all the plug-ins on the sequential list may be added to the exemplary process in order to ensure that all the plug-ins in the startup sequence are started. This alternative exemplary embodiment may be more efficient since the entire startup sequence is made available to the plug-in manager with a single call.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A system, comprising:
    a plug-in data structure to store plug-in data, the plug-in data structure including an initial list and an end list; and
    a plug-in manager to road the plug-in data structure and start plug-ins corresponding to an order in the plug-in data structure, wherein the plug-in manager starts plug-ins on the initial list prior to plug-ins on the end list.

2. The system according to claim 1, wherein the plug-in data structure further includes a method and the plug-in manager accesses the method to read the plug-in data structure.

3. The system according to claim 1, wherein the plug-in data structure contains a variable and the plug-in manager starts plug-ins unlisted on the initial list and end list between the plug-ins on the initial list and the end list when the variable is set.

4. The system according to claim 1, wherein the plug-in data structure contains a variable and the plug-in manager starts plug-ins unlisted on the initial list and end list in response to a request from a user.

5. The system according to claim 1, wherein the plug-in data includes names for the plug-ins.

6. The system according to claim 1, wherein the plug-in manager forms a startup sequence after reading the plug-in data structure.

7. The system according to claim 1, wherein the plug-in data is dynamically alterable.

8. The system according to claim 1, wherein the plug-in manager starts the plug-ins in a current thread.

9. The system according to claim 1, where in the plug-in manager starts the plug-ins in a background thread.

10. A software package including lines of computer code executable by a processor, comprising:
    a core application;
    a plurality of plug-ins, each plug-in providing a corresponding specific service to the core application;
    a plug-in data structure to store plug-in data, wherein the plug-in data structure includes an initial list and an end list; and
    a plug-in manager to manage starting of the plurality of plug-ins into the core application, wherein the plug-in manager assembles a startup sequence from the plug-in data structure, the startup sequence including a first one of the plurality of plug-ins from the initial list being a first plug-in in the startup sequence, and a second one of the plurality of plug-ins from the end list being a last plug-in in the startup sequence, and manages the starting of the plug-ins in an order the plug-ins appear in the startup sequence.

11. The software package according to claim 10, wherein each of the plurality of plug-ins unused in assembling the startup sequence is started in response to a request from the core application.

12. The software package according to claim 10, wherein the plug-in manager assembles the startup sequence and manages the starling of the plug-ins prior to performing another operation.

13. The software package according to claim 10, wherein the startup sequence is dynamically alterable.

14. A system comprising:
    a reading element to retrieve plug-ins on one of an initial list and an end list; and
    a starting element to start the retrieved plug-ins, wherein the plug-ins on the initial list are started prior to the plug-ins on the end list.

15. The system according to claim 14, wherein the plug-ins on the initial list are started in an order corresponding to an order in which the plug-ins appear on the initial list.

16. The system according to claim 14, wherein the plug-ins on the end list are started in an order corresponding to an order in which the plug-ins appear on the end list.

17. The system according to claim 14, wherein the starting element starts plug-ins unlisted on the initial list and the end list between the plug-ins on the initial list and the plug-ins on the end list.

18. The system according to claim 14, wherein the starting element starts plug-ins unlisted on the initial list and the end list after the plug-ins on the end list in response to a request from a user.

19. A method of starting plug-ins, comprising the steps of:
    reading a first set of plug-ins listed in an initial list;
    reading a second set of plug-ins listed in an end list;
    assembling a startup sequence from the first and second sets of plug-ins, wherein the first set of plug-ins is included in the startup sequence before the second set of plug-ins; and
    starting the plug-ins in the order corresponding to the startup sequence.

20. The method according to claim 19, wherein the first set of plug-ins is null.

21. The method according to claim 19, wherein the second set of plug-ins is null.

22. The method according to claim 19, further comprising the step of:
    reading a third set of plug-ins unlisted in the initial list and the end list, wherein the third set of plug-ins are included between the first set of plug-ins and the second-set of plug-ins in the startup sequence.

* * * * *